(No Model.)
W. H. HARRELSON.
CONSTRUCTION OF WATER TANKS.
No. 402,446. Patented Apr. 30, 1889.
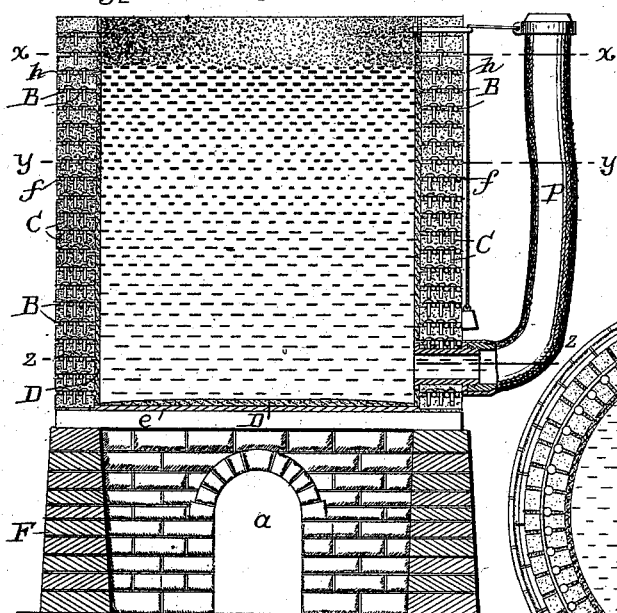
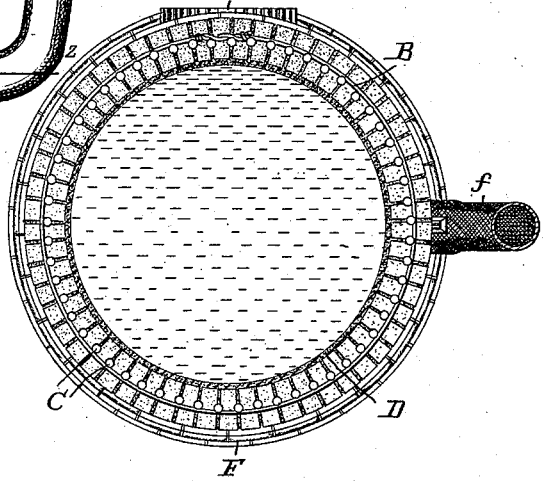
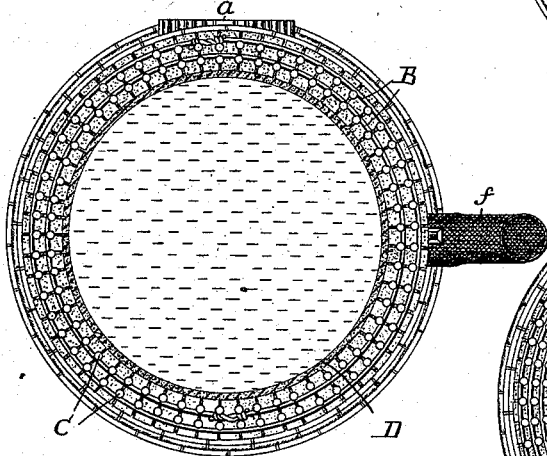
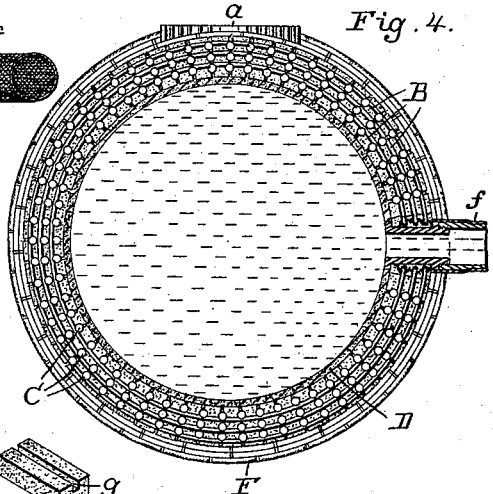
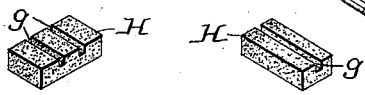
Witnesses,
F. J. Fischer
A. A. Higdon
Inventor,
W. H. Harrelson
By his Attorney J. C. D. Higdon

UNITED STATES PATENT OFFICE.

WILLIAM H. HARRELSON, OF KANSAS CITY, MISSOURI.

CONSTRUCTION OF WATER-TANKS.

SPECIFICATION forming part of Letters Patent No. 402,446, dated April 30, 1889.

Application filed December 5, 1888. Serial No. 292,742. (No model.)

*To all whom it may concern:*

Be it known that I, WILLIAM H. HARRELSON, of Kansas City, Jackson county, Missouri, have invented certain new and useful Improvements in the Construction of Water-Tanks, of which the following is a full, clear, and exact description, reference being had to the accompanying drawings, forming a part hereof.

My invention relates to an improved method of constructing reservoirs, tanks, and pipes for the storage or distribution of water, gas, or grain, the object being to provide a cheap and efficient means for the re-enforce strengthening of the walls of tanks, reservoirs, or distributing-pipes, that are mainly composed of cement, lime, and sand, stone, bricks of burned clay, terra-cotta, or similar materials which are employed to construct such receptacles or conduits.

With this object in view my invention consists of the peculiar construction and disposition of the parts, as will be hereinafter more fully understood from the following description and illustration.

Referring to the drawings making a part of this specification, Figure 1 is a side elevation in section, taken through its vertical axis, of a cylindrical tank for the reception of water, showing the peculiar construction of the wall which embodies my improvement. Fig. 2 is a plan view in section of a tank for holding water or other fluid, taken on the line *x x*, Fig. 1. Fig. 3 is a transverse section of the tank shown in Fig. 1, taken on the line *y y*, Fig. 1. Fig. 4 is a cross-section of the tank shown in Fig. 1, taken on the line *y y* or near the base of said tank. Fig. 5 is a view in detail of bricks which may be employed in the construction of the water-tank shown in Fig. 1.

A, Fig. 1, represents a water-tank such as is usually employed to contain a supply of water at stations along a railroad from which to replenish the tanks of locomotives. This tank is located upon a masonry wall, F, as shown in the figure, or, if preferred, it may be placed upon a suitable timber frame. The bottom *e* of tank A is preferably constructed of close-jointed planks of wood, which are laid upon the horizontal upper surface of the supporting-wall F.

Upon the wooden bottom *e*, which is preferably made circular in form, the cylindrical wall of the tank A is erected. Said wall is preferably built of bricks that are composed of clay and burned to render them hard, or stones dressed into proper shape may be used if they are preferred. The bricks or dressed stones are laid in regular layers after the approved mode of placing such component pieces of the wall, and as many rows of the bricks as may be needed to give necessary thickness to the wall are placed in said layers.

Between the adjacent rows of bricks in each successive layer of the same the nails or metal pins C are inserted, their heads projecting above the top surface of the layers, so that wire hoops or rings B may be placed to engage the projecting upper ends or necks of the said pins, and by a slight contraction of the diameter of the lines of rings in a horizontal layer of the bricks the circular wall may be tightly bound to prevent lateral disruption.

It should be stated that between each layer of the bricks, and also between the several rows which compose a layer, the joints are rendered water-tight by the employment of cement in plastic form, and when each successive layer of bricks or stone is coated with this cement or mortar the setting or hardening of the same will protect the wire or sheet metal hoops B from oxidation, and also securely bind the entire mass of the wall together.

On the inner surface of the tank-wall a coating, D, of water-proof cement, which is adapted to harden when in contact with water, is evenly spread of a suitable thickness to prevent any absorption of water or other stored liquid through the pores of the brick or stone composing the wall A, and a similar coating of the cement is deposited upon the wooden bottom of the tank, thus rendering it water-tight, while the re-enforcing bands or hoops B greatly strengthen the wall and prevent lateral pressure of the stored liquid from bursting the wall.

As it is evident that the pressure of liquid in the tank will be greater upon the lower portion of the vertical wall A of said tank than nearer the top edge of same, it is essential that there should be increased strength given the lower part of the wall, and to this end the number of concentric bands B is increased in the lower portion of the wall, as shown on the line z z, Fig. 1, and also in the transverse sectional view given in Fig. 4.

Three or more concentric bands or rings of metallic wire B are employed to re-enforce the lower portion of the cylindrical wall A. These are continued to a point, f, which represents about one-half the height of the tank, as shown in Fig. 1. From this point upward to the point h near the horizontal line x x the number of the bands is diminished, and from h to the top edge of the tank they are further reduced in number.

The drawings represent the maximum number of re-enforce bands as three, the next section above as consisting of two concentric bands, and the top section of one band.

The relative number of bands may be increased to suit the work, and the proportion of decrease in their number may be varied from the ratio given, the number in the illustrations being merely given to show the general method of construction.

In some cases it may be preferred to dispense with the pins or band-retaining nails C, substituting one or more grooves, g, which are cut or formed in the bricks H upon their faces, so that retaining-channels will be afforded, in which the wire bands B may be located. These when in place around a row or rows of bricks in the wall will be adapted to hold the wall secure and resist outward pressure.

The usual pipe, P, of canvas or other flexible water-proof material, is provided, or this pipe may be made of metal with a flexible joint on its lower end, said pipe being attached in any suitable manner to afford means for the discharge of water from the tank A into the water-receptacle of a locomotive-engine.

Having now fully described my invention, what I claim as new, and desire to secure by Letters Patent, is—

1. In the construction of water-tanks, &c., the combination, with the constituent parts of the wall of the structure, of series of encircling bands embedded in the wall and arranged each series of two or more bands in the same horizontal plane and firmly bound in place, the bands in each series increasing in number toward the bottom of the structure, substantially as set forth.

2. In the construction of water-tanks, &c., the combination, with the constituent parts of the wall of the structure, of series of encircling bands embedded in the wall and arranged each series of two or more bands in the same horizontal plane and let into grooves in the bricks of the wall, the bands in each series increasing in number toward the bottom, the same being decreased toward and to a minimum at the top, substantially as and for the purpose specified.

In testimony whereof I affix my signature in presence of two witnesses.

WILLIAM H. HARRELSON.

Witnesses:
F. G. FISCHER,
A. A. HIGDON.